(12) United States Patent
Baldus et al.

(10) Patent No.: US 7,965,845 B2
(45) Date of Patent: Jun. 21, 2011

(54) SYSTEM AND METHODS FOR EFFICIENT AUTHENTICATION OF MEDICAL WIRELESS AD HOC NETWORK NODES

(75) Inventors: Heribert Baldus, Aachen (DE); David Sanchez Sanchez, Aachen (DE)

(73) Assignee: Koninklijke Philips Electronics N. V., Eindhoven (NL)

( * ) Notice: Subject to any disclaimer, the term of this patent is extended or adjusted under 35 U.S.C. 154(b) by 1147 days.

(21) Appl. No.: 11/570,134

(22) PCT Filed: Jun. 7, 2005

(86) PCT No.: PCT/IB2005/051858
§ 371 (c)(1),
(2), (4) Date: Dec. 7, 2006

(87) PCT Pub. No.: WO2006/003532
PCT Pub. Date: Jan. 12, 2006

(65) Prior Publication Data
US 2007/0214357 A1    Sep. 13, 2007

Related U.S. Application Data

(60) Provisional application No. 60/583,835, filed on Jun. 29, 2004, provisional application No. 60/622,724, filed on Oct. 28, 2004.

(51) Int. Cl.
*H04L 9/08* (2006.01)
(52) U.S. Cl. .................. 380/279; 713/157; 713/173
(58) Field of Classification Search .............. 713/157, 713/173; 380/279
See application file for complete search history.

(56) References Cited

U.S. PATENT DOCUMENTS

| | | | |
|---|---|---|---|
| 2002/0124169 A1 | 9/2002 | Agrawal et al. | |
| 2003/0226013 A1* | 12/2003 | Dutertre | 713/163 |
| 2003/0233578 A1* | 12/2003 | Dutertre | 713/201 |
| 2004/0015689 A1* | 1/2004 | Billhartz | 713/156 |
| 2007/0214357 A1* | 9/2007 | Baldus et al. | 713/157 |

FOREIGN PATENT DOCUMENTS

| | | |
|---|---|---|
| WO | 0131836 A2 | 5/2001 |
| WO | 03107589 A1 | 12/2003 |

OTHER PUBLICATIONS

Bohio, M., et al.; Efficient identity-based security schemes for ad hoc network routing protocols; 2004; Ad Hoc Networks; vol. 2; pp. 309-317.

Deng, H., et al.; TIDS: threshold and identity-based security scheme for wireless ad hoc networks; 2004; Ad Hoc Networks; vol. 2; pp. 291-307.

(Continued)

*Primary Examiner* — Jason K Gee (57) ABSTRACT

A medical ad hoc wireless network (10) is deployed in a healthcare medical facility surrounding individual patients and including wireless nodes (A, B, ..., Z). Before deployment, each node (A, B, ..., Z) is pre-initialized with a public key certificate (22) and offers a trust and symmetric key distribution service (32). In joining the ad hoc network (10), a node (B) authenticates and registers to one randomly self-chosen node (A) by using certified public keys (20). Such node (A) becomes Trusted Portal ($TP_A$) of the node (B). The node (B) dynamically registers to a new self-chosen TP node when its old TP node leaves the ad hoc network (10). The network (10) supports symmetric key authentication between nodes registered to the same TP node. Additionally, it supports symmetric key authentication between nodes registered to different TP nodes.

15 Claims, 8 Drawing Sheets

OTHER PUBLICATIONS

Deng, H., et al.; Threshold and Identity-based Key Management and Authentication for Wireless Ad Hoc Networks; 2004; IEEE Proc. Intl. Conf. Inf. Tech.: Coding and Computing.

Jolly, G., et al.; A Low-Energy Key Management Protocol for Wireless Sensor Networks; 2003; Proc. of 8th IEEE Intl. Symposium on Computers and Communication.

Needham, R. M., et al.; Using Encryption for Authentication in Large Networks of Computers; 1978; Communications of the ACM; vol. 21, No. 12; pp. 993-999.

Poosarla, R., et al.; A Cluster Based Secure Routing Scheme for Wireless Ad Hoc Networks; 2004; IEEE; pp. 171-175.

Schneier, B.; Applied Cryptography, Protocols, Algorithms, and Source Code in C; 1996; Applied Cryptography; John Wiley & Sons, NY; pp. 47-65, 566-572.

Venkatraman, L., et al.; A Novel Authentication Scheme for Ad Hoc Networks; 2000; IEEE Wireless Communications and Networking Conf.; vol. 3; pp. 1268-1273.

Zhu, S., et al.; Establishing Pairwise Keys for Secure Communication in Ad Hoc Networks: A Probabilistic Approach; 2003; Proc. of 11th IEEE Int. Conf. on Network Protocols.

Menezes, A. J., et al.; Handbook of Applied Cryptography; 1996; CRC Press; Chapter 10 "Identification and Entity Authentication"; pp. 385-424. Also at: www.cacr.math.uwaterloo.ca/hac/.

* cited by examiner

SYSTEM AND METHODS FOR EFFICIENT AUTHENTICATION OF MEDICAL WIRELESS AD HOC NETWORK NODES

CROSS REFERENCE TO RELATED APPLICATIONS

This application claims the benefit of U.S. provisional application Ser. No. 60/583,835 filed Jun. 29, 2004, and U.S. provisional application Ser. No. 60/622,724 filed Oct. 28, 2004, both of which are incorporated herein by reference.

DESCRIPTION

The present invention relates to the security in the network systems and methods. It finds particular application in conjunction with medical wireless ad hoc network systems and will be described with particular reference thereto. However, it is to be appreciated that the invention will also find application in conjunction with other short-range network systems and the like.

Typically, wireless mobile ad hoc networks are deployed in hospitals and medical facilities for medical patient care and monitoring. Commonly, a medical mobile ad hoc network is established around a patient or a small group of patients. In the medical mobile ad hoc network, medical devices communicate peer-to-peer. Each device offers a set of medical services and demands access to a set of medical services on other devices. The access to such devices is also given to the clinicians who, for example, using a PDA can trigger an infusion pump to administer morphine to a patient.

It is essential to ensure that only the right entities access medical mobile ad hoc networks, and to ensure confidentiality and integrity of wireless communications. In the example discussed above, the doctor can trigger an infusion pump to administer morphine to a patient, but a patient's visitor must be restrained from such an act.

Entity authentication is the basis for subsequent access control and establishment of protected communication. Entity authentication protocols, which are typically used in infrastructure networks, are based on either public key or symmetric key cryptography. However, these protocols are not suitable for mobile ad hoc networks. In a public key cryptography authentication protocol, a node A validates a node's B knowledge of the private key associated to node's B public key. Node's B public key must be certified and associated to node's B identity by a trusted third party (TTP) common to A and B. Public key cryptography involves a great deal of computational power. Studies show that an RSA private key encryption takes about eighteen seconds on a 133 MHz handheld. Consequently, with moderate computing-power devices employed by the ad hoc network systems, the user's access to the services is delayed and battery resources are exhausted. The problem with typical symmetric key cryptography authentication protocols resides in the absence of online infrastructure support. Therefore, an online trusted third party (TTP) is not available to distribute common symmetric keys to two authenticating nodes. An alternative solution is the pre-distribution of identity-labeled pair-wise symmetric keys to all mobile nodes before deployment. However, symmetric key cryptology is limited in scalability and security administration. Key management is vastly complicated, e.g. when updating a key in one of the nodes or adding a new node, the rest of nodes must also be updated to share a key with the new node. There are many pairs of keys to be managed. The management of the system with a large population of nodes can become practically infeasible since the storage requirements of the system grow as $N^2$.

Accordingly, there is a need for an efficient authentication system suitable for low power mobile devices. The present invention provides a new system and methods which overcome the above-referenced problems.

In accordance with one aspect of the present invention, a security system for an ad hoc wireless network is disclosed. The security system comprises a plurality of local wireless network nodes. A means distributes trust and symmetric keys among the ad hoc network nodes.

In accordance with another aspect of the present invention, a method of key management is disclosed. Trust and symmetric keys are distributed among nodes of an ad hoc network.

One advantage of the present invention resides in providing computationally efficient authentication protocols suitable for low-computing power and battery powered mobile devices.

Another advantage resides in an authentication system without requiring online support from infrastructure network or central servers.

Another advantage resides in node authentication based on certified node identities regulated by an administrative entity.

Another advantage resides in distributing the symmetric keys within the ad hoc network without the need to contact external key distribution servers.

Another advantage resides in random and dynamic distribution of key distribution functionality among ad hoc network nodes. Therefore, the availability and robustness of the security system is optimized.

Another advantage resides in secure distribution of security material, patient data and other confidential information.

Still further advantages and benefits of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating the preferred embodiments and are not to be construed as limiting the invention.

Figure 1:
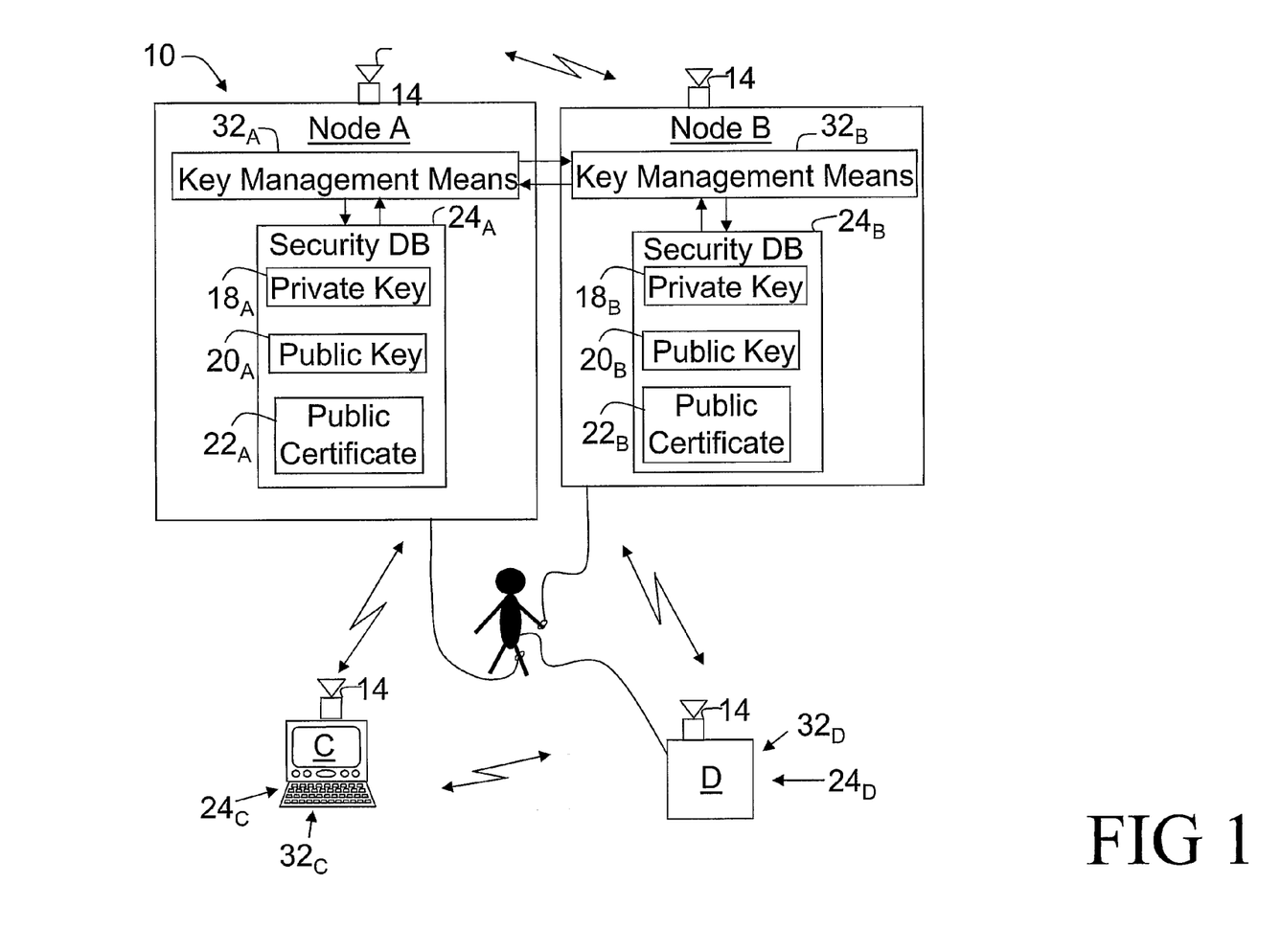
FIG. 1 is a diagrammatic illustration of an ad hoc wireless network.

With reference to FIG. 1, each short-range ad hoc wireless network 10 includes mobile nodes (A, B, . . . , Z) owned by a single administrative entity, e.g. a hospital, an enterprise, a factory, or the like. Typically, each ad hoc network 10 includes from ten to twenty self-organized nodes (A, B, . . . , Z) which are connected by wireless single-hop links with no fixed network infrastructure support. Preferably, the mobile nodes (A, B, . . . , Z) include physiological monitoring devices, controlled medication administration devices, PDA-like devices, embedded computing systems, or the like devices which have moderate computing power. Preferably, a number of independent short-range ad hoc networks 10 are spread randomly in a well-limited deployment area. The wireless coverage area of each ad hoc network 10 ranges for up to forty meters, extending thus often beyond the deployment area. For example, one network may include nodes for each physiological monitor, medication administration device, computer-based patient ID, attending physician's PDA, and the like, but specifically excluding like devices associated with other patients.

Preferably, new nodes (A, B, . . . , Z) join or leave any of the ad hoc networks 10 sporadically, i.e., the topology of the network 10 is unknown a priori. Preferably, the nodes are in a communication range to perform security mechanisms without undesired interruptions. Each mobile node (A, B, . . . , Z) offers one or more network services. Each node (A, B, . . . , Z) can communicate peer-to-peer with any other node in the network system 10 via transmitting/receiving means 14 to access one or more services. Peer-to-peer communications is preferably unidirectional and bidirectional and can be synchronous and asynchronous. Of course, it is also contemplated that a physician can access the node (A, B, . . . , Z) to provide a service to the patient, e.g. administer a medication, check a status of the monitoring equipment, and the like, by using a portable computer, PDA, or the like.

Preferably, the nodes (A, B, . . . , Z) are tamper-proof protected, so no information can be learnt tampering them. Furthermore, the nodes (A, B, . . . , Z) of the network system 10 behave properly and do not issue false assertions or statements.

Initially, before deployment of the nodes (A, B, . . . , Z), the nodes (A, B, . . . , Z) are initialized with security material of a Public Key Infrastructure (PKI) operating with an offline certification authority (CA) (not shown). In a secure perimeter, the offline CA issues a digital public key certificate, a private key and a CA's public key to each node (A, B, . . . , Z). Each public key certificate binds a certified unique node's identity with its corresponding public key. Each node (A, B, . . . , Z) securely holds its private key 18, the CA's public key 20, and the public key certificate 22 in a security database 24.

The nodes (A, B, . . . , Z) can act both as local security servers and as security clients within the ad hoc network 10. As a security client, a node can take the role either of a supplicant or of an authenticator. In a node-to-node communication, the supplicant is a node that demands access to a second node. The authenticator is the second node, which needs to verify the accessing node's identity. As a security server, a node takes the role of Trusted Portal (TP). A trusted portal offers an online trusted third party service to the trusted nodes in its TP-domain as will be discussed in a greater detail below.

The security system is based on cooperation of the nodes and unconditional trust of the node to the TP given that all nodes belong to the same administrative (or PKI) domain and that physical security safeguards are deployed.

Figure 2A:
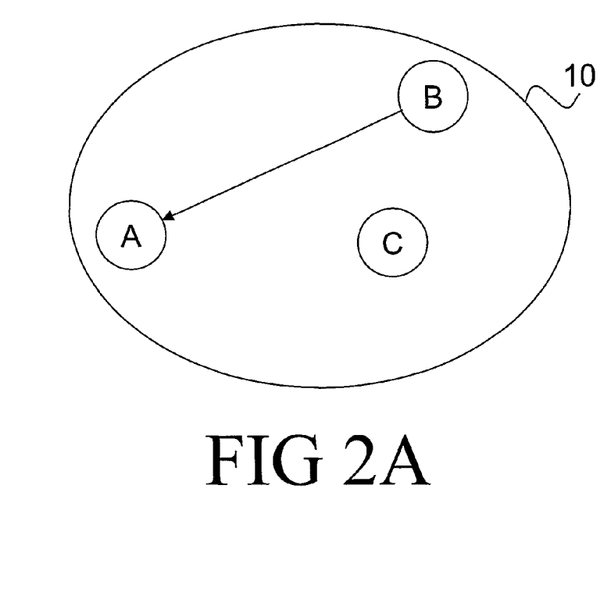
FIGS. 2A-B diagrammatically show a first mobile node of the ad hoc network establishing a trust relationship with a first trusted portal and creating a first TP-domain.
Figure 2B:
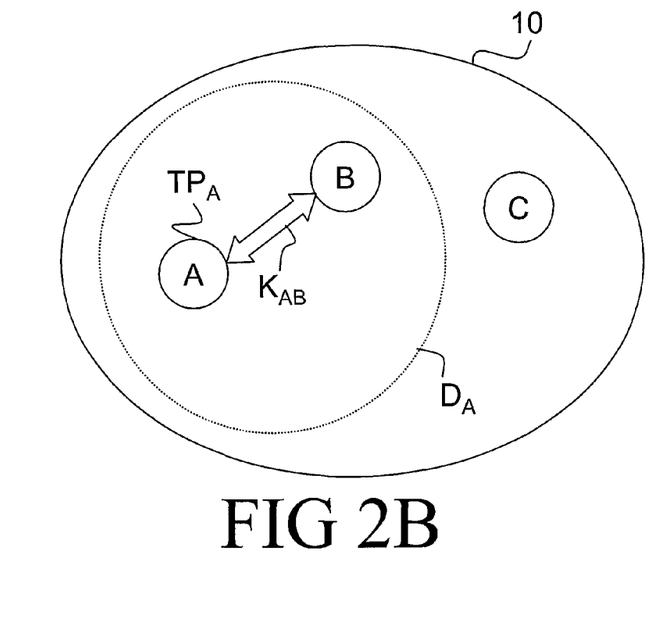
Figure 3:
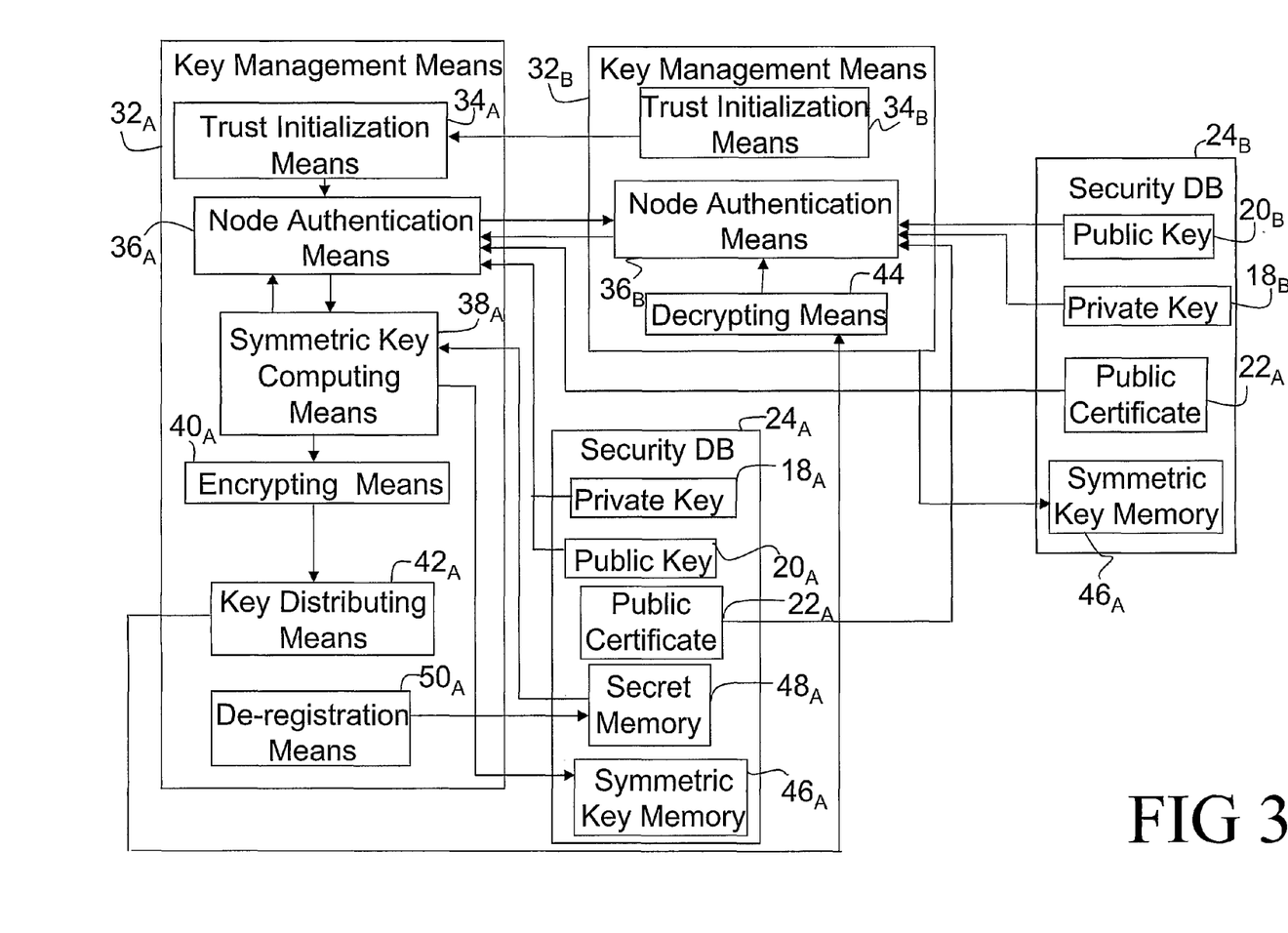
FIG. 3 is the illustration of functional blocks of a portion of the ad hoc wireless network.

With continuing reference to FIG. 1 and further reference to FIGS. 2A-B and 3, each node (A, B, . . . , Z) includes a Key Management means or center or process $32_A$, $32_B$, . . . $32_Z$, which provides trust establishment among the nodes (A, B, . . . , Z) and distribution of long-term symmetric keys to enable the nodes (A, B, . . . , Z) to authenticate each from that moment on. A trust initialization means or process $34_A$, $34_B$ enables a node B, unknown to a node A, to set up a trusted portal (TP) in the ad hoc network 10 by arbitrarily self-choosing the node A as its trusted portal and sending a service request to the node A.

More specifically, the node B trust initialization means $34_B$ issues a service request to the node A trust initialization means $34_A$. A node authentication means $36_A$ of the node A authenticates the node B by using the CA's public key $20_A$, the node's B public key certificate $22_B$ and the node's B private key $18_B$. Such authentication is well known in the art. (See, for example, The Handbook of Applied Cryptography, by A. Menezes, P. Van Oorschot and S. Vanstone, CRC Press, 2001.) Next, the node authentication means $36_B$ of the node B authenticates the node A by a use of the CA's public key $20_B$, the node's A public key certificate $22_A$ and the node's A private key $18_A$. Once the nodes A and B mutually authenticate each other using certified public keys $20_A$, $20_B$, the node B sets the node A as its trusted portal $TP_A$, and a session key is derived.

A symmetric key computing means $38_A$ calculates a long-term symmetric key $K_{AB}$ that allows the node A to identify a registered node B from now on. The symmetric key $K_{AB}$ is also used for protecting the contents of messages in next communications between the nodes A and B. The calculation of the symmetric key $K_{AB}$ is based, for example, on the calculation of shared keys for Lotus Notes Session Resumption, well known in the art. E.g., the symmetric key computing means $38_A$ computes the key $K_{AB}$ by calculating the hash of the concatenation of a long term self-calculated secret $S_A$ known only to the node A, with the node's B identity $ID_B$:

$$K_{AB} = h(S_A, ID_B).$$

The hash algorithm is well known in the art. E.g., a hash function h(m) is a one-way mathematical transformation that takes a message m of an arbitrary length and computes from it a fixed-length short number h(m). Given m, computing h(m) is relatively easy. Given h(m), computing m is computationally infeasible. In addition, it is computationally infeasible to get two messages m1 and m2 with the same h(m).

With continuing reference to FIG. 3, an encrypting means $40_A$ encrypts and integrity protects the symmetric key $K_{AB}$. A key distributing means $42_A$ sends the encrypted symmetric key $K'_{AB}$ using the session key to the node B. A node B decrypting means $44_B$ decrypts the encrypted key $K'_{AB}$.

The symmetric key $K_{AB}$ is stored in corresponding symmetric key memories $46_A$, $46_B$. From now on, the node B is registered as a trusted node with the node A.

In one embodiment, the node A does not store the symmetric key $K_{AB}$ but only the secret $S_A$ in a secret memory $48_A$. The node A can recalculate the key $K_{AB}$ anytime from the secret $S_A$ and the node's B identity $ID_B$, which is provided by the node B during the trust initialization process. A compromise of the node A security database $24_A$ does not reveal any information about the registered node B. The storage requirements are kept constant, not depending on the number of the registered nodes.

The node B can establish an initial trust with whatever node it chooses within the ad hoc network 10. The initialization process $34_A$, $34_B$ requires the nodes A, B to have only moderate computing power and valid public key certificates.

With reference again to FIG. 2B, as a result of the trust initialization, authentication and symmetric key distribution, a node A TP-domain $D_A$ is created, containing the node B as the trusted node, i.e. $D_A = \{ID_B\}$. The trusted portal $TP_A$ vouches for the identity of a trusted node B to other trusted nodes.

Figure 4A:
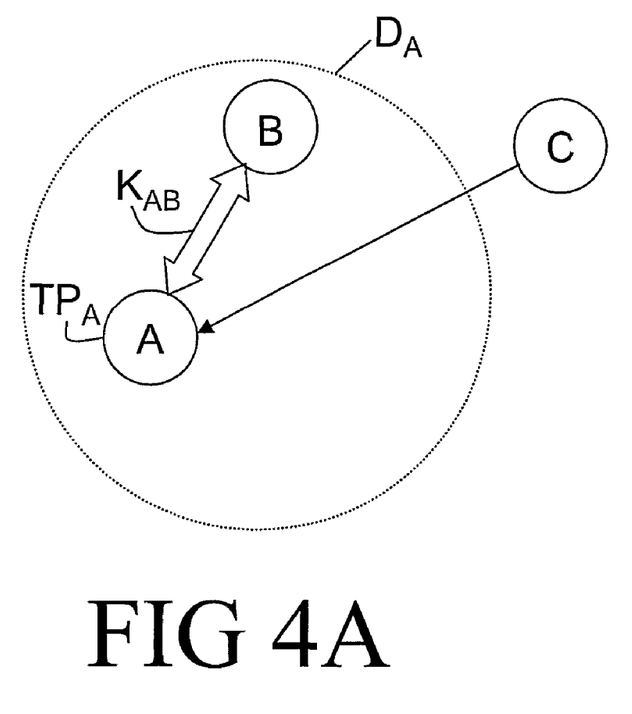
FIGS. 4A-B diagrammatically show a second mobile node of the network system establishing a trust relationship with the same first trusted portal and joining the first TP-domain.
Figure 4B:
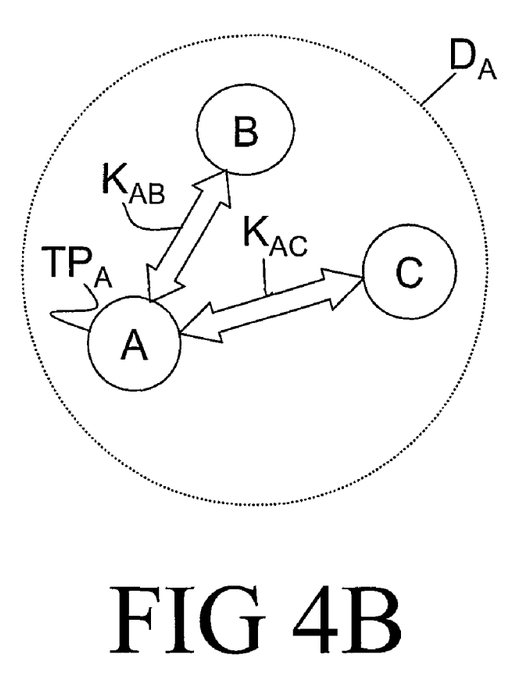

With reference to FIGS. 4A-B, although initially the node A is not a trusted portal of any other node in the network system 10, after initial trust establishment by the node B, the node A can also serve as the trusted portal $TP_A$ to other nodes in the network system 10. All the nodes, that set trust with the $TP_A$, form TP-domain $D_A$ of the node A. E.g., the TP-domain $D_A$ grows when a node C sets initial certified trust to the node A and obtains a shared symmetric key $K_{AC}$. The node A is the TP-domain administrator of its own TP-domain $D_A$, i.e. the node A decides when to accept a node in its TP-domain $D_A$ or when a trust relationship expires.

With reference again to FIG. 3, a de-registration means or process $50_A$ enhances security by regulating the lifetime of the node A TP-domain $D_A$ by the life cycle of the secret $S_A$, i.e. the time the node A holds the same value of the secret $S_A$. After a prespecified period of time $T_1$, the de-registration means $50_A$ nullifies the value of a current secret $S^1_A$ by calculating a random number R which becomes a second secret $S^2_A$. As a result, all previous established trusted nodes are automatically de-registered. E.g., when the secret value $S^1_A$ is changed to $S^2_A$, the symmetric key $K_{AB}$, which has been previously distributed to the node B, does not match $S^2_A$ and, thus, is not a valid shared-key to authenticate the node B to the node A. This makes the node B newly unknown node to the node A. Preferably, the de-registration process $50_A$ is performed anytime when the trusted portal $TP_A$ moves away from the ad hoc network 10. After the deregistration, the above-described registration is repeated to build a new TP-domain. Particularly, if the node A has left the network 10, one of the other nodes assumes the central responsibility.

Figure 5A:
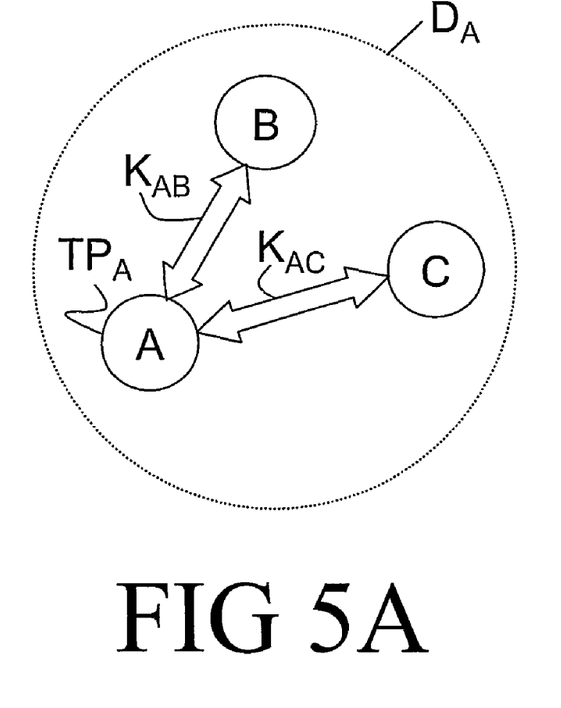
FIGS. 5A-B diagrammatically shows a first mobile node establishing a trust relationship with a second mobile node when both nodes belong to the same TP-domain.
Figure 5B:
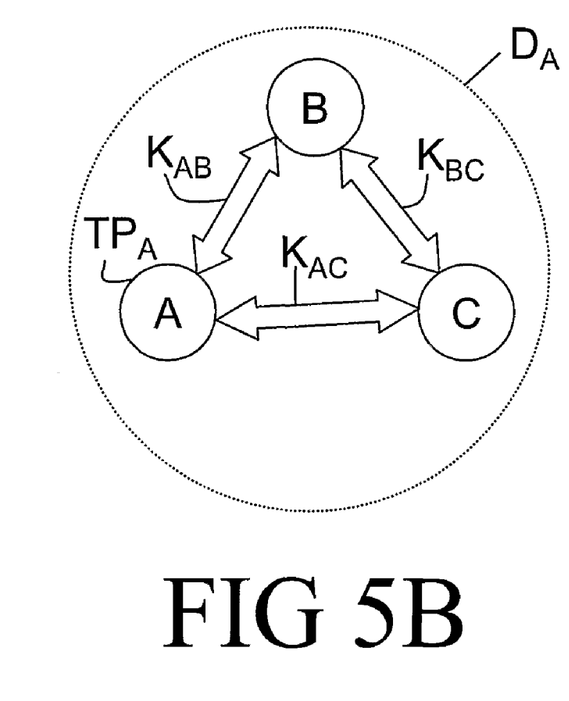
Figure 6:
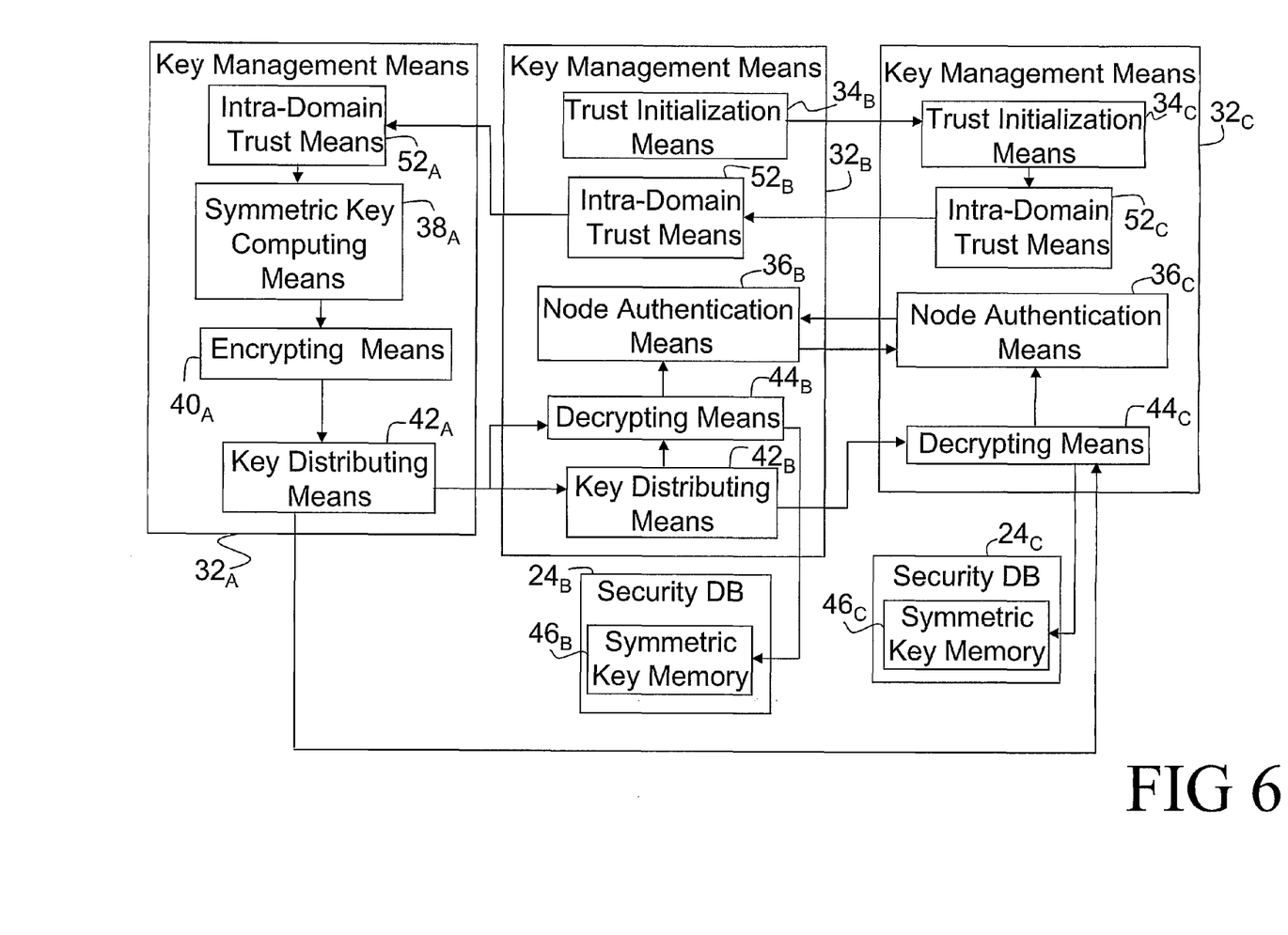
FIG. 6 is the illustration of functional blocks of another portion of the ad hoc wireless network.

With reference to FIGS. 5A-B and 6, the trusted portal $TP_A$ acts as an online trusted third party by securely distributing a shared symmetric key $K_{BC}$ to the nodes B and C, which are members of the TP-domain $D_A$ that share corresponding symmetric keys $K_{AB}$, $K_{AC}$ with the node A. An intra-domain trust and key distribution (ITKD) means or process or protocol $52_A$ allows the reference node A to send a key associated to the identity of the trusted node B to another trusted node C when both nodes B, C are included in the trusted TP-domain $D_A$.

More specifically, the node B trust initialization means $34_B$ sends to a node C trust initialization means $34_C$ a request for access. The node C trust initialization means $34_C$ determines that the node B belongs to the same TP-domain $D_A$ of the trusted portal $TP_A$. A node C intra-domain means $52_C$ communicates to a node B intra-domain means $52_B$ that the node C belongs to the same TP-domain $D_A$.

The intra-domain means $52_B$ of the node B contacts the intra-domain means $52_A$ of the trusted portal $TP_A$ and requests a symmetric key to the node C. The request is encrypted under the key $K_{AB}$ to guarantee the confidentiality of the process and the anonymity of the trusted portal $TP_A$. The symmetric key computing means $38_A$ of the node A generates a random authentication symmetric key $K_{BC}$ for the nodes B, C which is encrypted and distributed to the nodes B, C. More specifically, a node A encrypting means $40_A$ encrypts and integrity protects the key $K_{BC}$ and the node's C identifier $ID_C$ with the key $K_{AB}$. The key distributing means $42_A$ sends the encrypted key $K'_{BC}$ to the node B. Next, the node A encrypting means $40_A$ encrypts and integrity protects the key $K_{BC}$ and the node's B identifier $ID_B$ with the key $K_{AC}$. The node A key distributing means $42_A$ sends the encrypted key $K''_{BC}$ to the node C. Alternatively, to optimize the efficiency of the ITKD process, the supplicant or the node B triggers the ITKD process $52_A$ and the trusted portal $TP_A$ communicates exclusively with the node B. The key distributing means $42_A$ distributes the encrypted keys $K'_{BC}$, $K''_{BC}$ to the node B. A node B key distributing means $42_B$ forwards the encrypted key $K'_{BC}$ to the node C. Corresponding decrypting means $44_B$, $44_C$ decrypts the encrypted keys $K'_{BC}$, $K''_{BC}$. The shared symmetric key $K_{BC}$ is stored in corresponding symmetric key memories $46_B$, $46_C$. A node C authentication means $36_C$ uses the symmetric key $K_{BC}$ to authenticate the node B. Of course, it is also contemplated that the node B authentication means $36_B$ can authenticate the node C by a use of the symmetric key $K_{BC}$.

The nodes B, C will not accept a key distributed by the node A if the nodes B, C do not have an established relationship with the node A. Likewise, the node A does not directly distribute keys to unknown nodes, i.e. to the nodes not belonging to the node A TP-domain $D_A$.

The trust initialization process 32 is utilized every time a new node joins the ad hoc network 10 or a trusted portal disappears. For instance, if the trusted portal $TP_A$ leaves the ad hoc network 10, the nodes B and C need to establish a new trusted portal. Establishing trust among the nodes (A, B, . . . , Z) of the ad hoc network 10 in this manner, a random path of trusted portals interconnects all the nodes (A, B, . . . , Z) in the ad hoc network 10. As will be discussed in a greater detail below, cooperation among different trusted portals enables vouching for the nodes trusted by different trusted portals. The trusted portals of different TP-domains coordinate to act as trusted third parties by securely distributing a common symmetric key to nodes in different TP-domains.

Figure 7A:
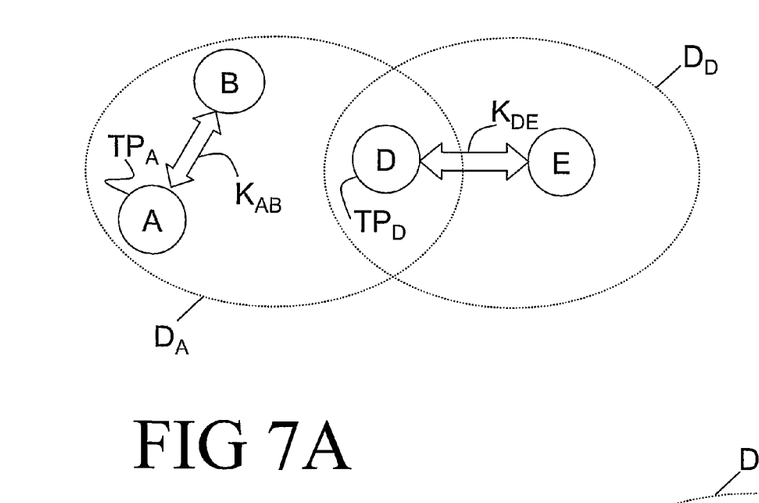
FIGS. 7A-B diagrammatically show a first mobile node establishing a trust relationship with a second mobile node when both nodes belong to different TP-domains.
Figure 7B:
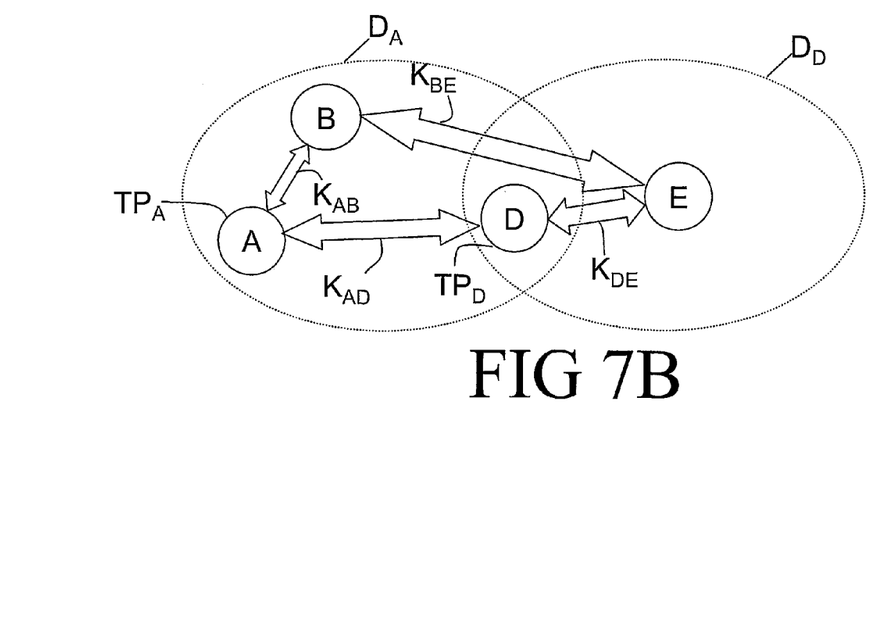
Figure 8:
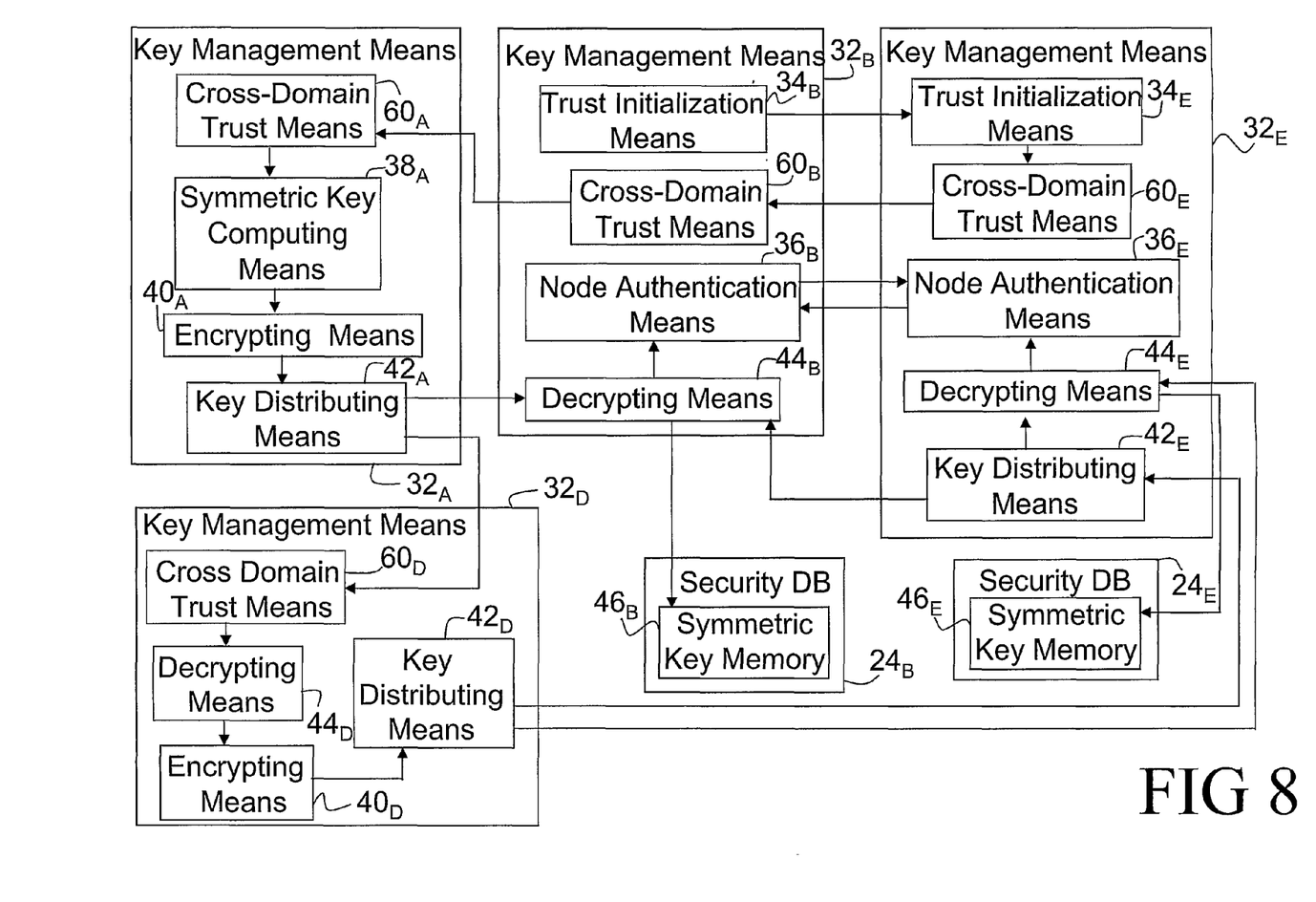
FIG. 8 is the illustration of functional blocks of another portion of the ad hoc wireless network.

With reference to FIGS. 7A-B and 8, a cross-domain trust means or protocol or process $60_A$, $60_B$, $60_D$, $60_E$ enables two or more trusted portals $TP_A$, $TP_D$ to send a key associated to the identity of the node B included in the TP-domain $D_A$ of the trusted portal $TP_A$ to a node E included in a TP-domain $D_D$ of the trusted portal $TP_D$, e.g. a node D, which is a trusted node of the node A which has been already initialized as explained above.

More specifically, the node B trust initialization means $34_B$ sends to a node E trust initialization means $34_E$ a request for access. The node E trust initialization means $34_E$ determines that the node B belongs to a different TP-domain. The node E cross-domain means $60_E$ communicates to the node B cross-domain means $60_B$ that the node E belongs to a different TP-domain. Preferably, the node E cross-domain means $60_E$ communicates to the node B cross-domain means $60_B$ that the node E belongs to the TP-domain $D_D$ of the trusted portal $TP_D$. Since the trusted TP-domains build hierarchically, two different trusted portals are interconnected by either a direct trust relationship or by a set of them. In one embodiment, the cross-domain means $60_A$ determines the shortest path to a target node.

The node B cross-domain trust means $60_B$ contacts the cross-domain trust means $60_A$ of the trusted portal $TP_A$ and requests a key to communicate to the node E. The request is encrypted under the key $K_{AB}$ to guarantee the confidentiality of the process and the anonymity of the trusted portal $TP_A$. The node A symmetric key computing means $38_A$ randomly generates a new authentication symmetric key $K_{BE}$ for the nodes B, E. The encrypting means $40_A$ encrypts and integrity protects the key $K_{BE}$ and the node's E identifier $ID_E$ with the key $K_{AB}$. The key distributing means $42_A$ sends the encrypted key $K'_{BE}$ to the node B. Next, the encrypting means $40_A$ encrypts the key $K_{BE}$ and the node's B identifier $ID_B$ with the key $K_{AD}$. The key distributing means $42_A$ sends the encrypted key $K''_{BE}$ to the trusted portal $TP_D$. A node D decrypting means $44_D$ decrypts the encrypted key $K''_{BE}$ to obtain the key $K_{BE}$. A node D encrypting means $40_D$ encrypts and integrity protects the key $K_{BE}$ by using the key $K_{DE}$. A node D key distributing means $42_D$ forwards the encrypted key $K'''_{BE}$ to the node E. In one embodiment, the key distributing means $42_A$ securely forwards the encrypted keys $K'_{BE}$, $K''_{BE}$ to the node D. The node D decrypting means $44_D$ decrypts the encrypted key $K''_{BE}$ to obtain the key $K_{BE}$. The node D encrypting means $40_D$ encrypts and integrity protects the key $K_{BE}$ by using the key $K_{DE}$. The key distributing means $42_D$ forwards the encrypted keys $K'_{BE}$, $K'''_{BE}$ to the node E. A key distributing means $42_E$ of the node E forwards the encrypted key $K'_{BE}$ to the node B. Corresponding decrypting means $44_B$, $44_E$ decrypts the encrypted keys $K'_{BE}$, $K'''_{BE}$. Using the symmetric key $K_{BE}$ as an authentication protocol, a node E authentication means $36_E$ authenticates the node B. Alternatively, the node B authentication means $36_B$ authenticates the node E. The symmetric key $K_{BE}$ is stored in corresponding symmetric key memories $46_B$, $46_E$ of the corresponding nodes B, E.

The cross-domain trust process works similarly for a larger number of intermediate trusted portals.

In one embodiment, to protect against replay attacks, the encrypted messages are additionally integrity protected, e.g. by including timestamps or periodically regenerating encryption keys and re-establishing the network.

The invention has been described with reference to the preferred embodiments. Modifications and alterations may occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A security system for an ad hoc wireless network comprising a plurality of local wireless network nodes, each node associated with a piece of medical equipment and including:
   a transmit/receive unit which distributes trust and symmetric keys among the local wireless network nodes;
   a memory which stores at least one of a digital public key certificate, a private key and a public key provided by an offline certification authority; and
   one or more processors programmed to:
      mutually authenticate at least two nodes using at least one of a digital public key certificate, a private key and a public key stored in the memories of the first and second nodes;
      declare an arbitrary first one of the nodes to be a trusted portal;
      in the trusted portal, calculating a first symmetric key for communications between the first and second nodes;
      in the trusted portal, calculating a second symmetric key for communications between the second node and a third node being added to the ad hoc wireless network.

2. The system according to claim 1, wherein computing the second symmetric key for communications between the second and third node includes hashing a calculated secret known only to the first node with an identifier of the third node.

3. The system according to claim 2, wherein the secret known only to the first node is recalculated periodically.

4. The system according to claim 2, wherein the processor in the first node is further programmed to:
   encrypt the second symmetric key for communications between the second and third nodes with the first symmetric key for communications between the first and second nodes.

5. A method of key management in an ad hoc wireless network, the network having a plurality of nodes, each node having a processor, a memory, and a transmit/receive unit comprising:
   with the processors of a plurality of the nodes, establishing a first node as a first trusted portal which first node is arbitrarily selected from the nodes of the network;
   with the processors of the first trusted portal and a second node, performing an initial authentication between the first trusted portal and the second node; and
   with the processor of the first trusted portal, computing a first symmetric key wfor communication between the first trusted portal and the second node to establish a first trusted portal domain;
   with the processors of the first trusted portal and a third node, performing an initial authentication between the first trusted portal and the third node;
   with the processor of the first trusted portal, computing a second symmetric key for communication between the first trusted portal and the second node to add the third node to the first trusted portal domain, the second symmetric key being different from the first symmetric key;
   with the processor of the first trusted portal, computing a symmetric key for communications between the second and third nodes.

6. A network having a plurality of nodes programmed for performing the method of claim 5.

7. The method according to claim 5, wherein the step of computing symmetric keys includes calculating a hash of a calculated secret known only to the first trusted portal and identities of one of the other nodes.

8. The method according to claim 7, further including: periodically recalculating the calculated secret.

9. The method according to claim 5, further including:
   with the processor of the first trusted portal, encrypting the second symmetric key for communication between the second and third nodes with the first symmetric key between the first trusted portal and the second node;
   with the send/receive units of the first trusted portal and the second node, communicating the encrypted second symmetric key to the second node;
   with the processor of the second node, decrypting the encrypted symmetric key for communication between the second and third nodes.

10. The method according to claim 5, further including:
    with the processor of the first trusted portal, discarding the second symmetric key for communication between the first trusted portal and the second node and recomputing the first symmetric key for communication between the trusted portal and the second node each time the first trusted portal and the second node communicate.

11. The method according to claim 5, further including:
    with the processor of one of the first trusted portal and a second trusted portal, computing a third symmetric key for communicating between a node of the first trusted portal domain and a node in a domain of the second trusted portal.

12. The method according to claim 11, further including:
    with the processors of the first and second trusted portals, generating a fourth symmetric key for communication between the first and second trusted portals;
    with one of the nodes of the first trusted portal domain, requesting access to a node in the second trusted portal domain;
    with the processor of the node in the second trusted portal domain, determining that the requesting node from the first trusted portal domain belongs to a different trusted portal domain and communicating that the node of the second trusted portal domain belongs to a different domain to the node of the first trusted portal domain;

with the node of the first trusted portal domain, contacting the first trusted portal to request a key to communicate with the node of the second trusted portal domain;

with the processor of the first trusted portal, generating the third symmetric key for communications between the node of the first trusted portal domain and the node of the second trusted portal domain;

with the processor of the first trusted portal, encrypting the third symmetric key with a previously calculated symmetric key for communications between the first trusted portal and the node of the first trusted portal domain;

communicating the encrypted third symmetric key to the first trusted portal domain node;

decrypting the encrypted third symmetric key with the node of the first trusted portal domain;

with the processor of the first trusted portal, encrypting the third symmetric key with the fourth symmetric key for communicating between the first trusted portal and the second trusted portal;

communicating the encrypted third symmetric key to the second trusted portal;

decrypting the encrypted third symmetric key with the processor of the second trusted portal;

communicating the third symmetric key from the second trusted portal to the node of the second trusted portal domain; and using the third symmetric key to communicate between the node of the first trusted portal domain and the node of the second trusted portal domain.

13. The method according to claim 5, further including:

with the processors of the first trusted portal and a second trusted portal, generating a portal-portal symmetric key for communication between the first and second trusted portals;

with one of the nodes of the first trusted portal domain, requesting access to a node in the second trusted portal domain;

with the first trusted portal domain node, contacting the first trusted portal to request a key to communicate with the second trusted portal domain node;

with the processor of the first trusted portal, generating a node-node symmetric key for communications between the first trusted portal domain node and the second trusted portal domain node;

with the processor of the first trusted portal, communicating the node-node symmetric key to the first trusted portal domain node;

with the processor of the first trusted portal, encrypting the node-node symmetric key with the portal-portal symmetric key and communicating the encrypted node-node symmetric key to the second trusted portal;

decrypting the encrypted node-node symmetric key with the processor of the second trusted portal and communicating the node-node symmetric key from the second trusted portal to the second trusted portal domain node; and using the node-node symmetric key to communicate between the first trusted portal domain node and the second trusted portal domain node.

14. The method according to claim 5, further including:

dissolving the first trusted portal domain;

selecting a different node to act as a new trusted portal;

with the new trusted portal, generating symmetric keys to create a new trusted portal domain.

15. The method according to claim 5, further including:

in response to the first node being removed from the network, selecting another node to be the trusted portal and forming a new domain.

* * * * *